United States Patent

[11] 3,576,227

| [72] | Inventors | Wilhelm Konrad Lippl<br>Oxenbronn;<br>Franz Xaver Lenzer, Kleinkotz, Germany |
| [21] | Appl. No. | 784,707 |
| [22] | Filed | Dec. 18, 1968 |
| [45] | Patented | Apr. 27, 1971 |
| [73] | Assignee | Karl Mengele & Sohne<br>Gunzburg, Germany |
| [32] | Priority | Dec. 21, 1967, Jan. 26, 1968, Jan. 27,<br>1968, Feb. 1, 1968, Aug. 10, 1968 |
| [33] | | Germany |
| [31] | | P1582372.0, P1632777.8, P1632820.4,<br>P1632778.9 and P1782299.0 |

[54] ATTACHMENT DEVICE FOR AN AGRICULTURAL MACHINE
15 Claims, 8 Drawing Figs.

[52] U.S. Cl. .................................................. 180/14,
172/47, 180/53, 56/10
[51] Int. Cl. .................................................. B62d 59/02
[50] Field of Search .......................................... 180/14, 53;
172/47, 446, 448, 451; 56/10, 370; 280/411

[56] References Cited
UNITED STATES PATENTS

| 2,491,232 | 12/1949 | Turnbull .......................... | 280/411X |
| 2,494,080 | 1/1950 | Andrews et al. .................. | 280/411X |
| 2,766,835 | 10/1956 | Witt ................................. | 172/47X |
| 2,868,305 | 1/1959 | Surratt ............................. | 172/47 |
| 3,028,919 | 4/1962 | Smith et al. ...................... | 172/47X |

FOREIGN PATENTS

| 602,092 | 2/1960 | Italy ................................ | 172/47 |
| 1,491,376 | 7/1967 | France ............................. | 56/370 |

*Primary Examiner*—Kenneth H. Betts
*Attorney*—McGlew and Toren

ABSTRACT: A transversely arranged carrier arm is attached to the rear of a prime mover for securing an agricultural implement alongside the prime mover. The carrier arm is formed of a plurality of hollow members which support power transmission means extending from the prime mover to the agricultural implement. The length of the carrier arm and of the power transmission means is adjustable. The multiple section carrier arm is formed in a somewhat curved configuration.

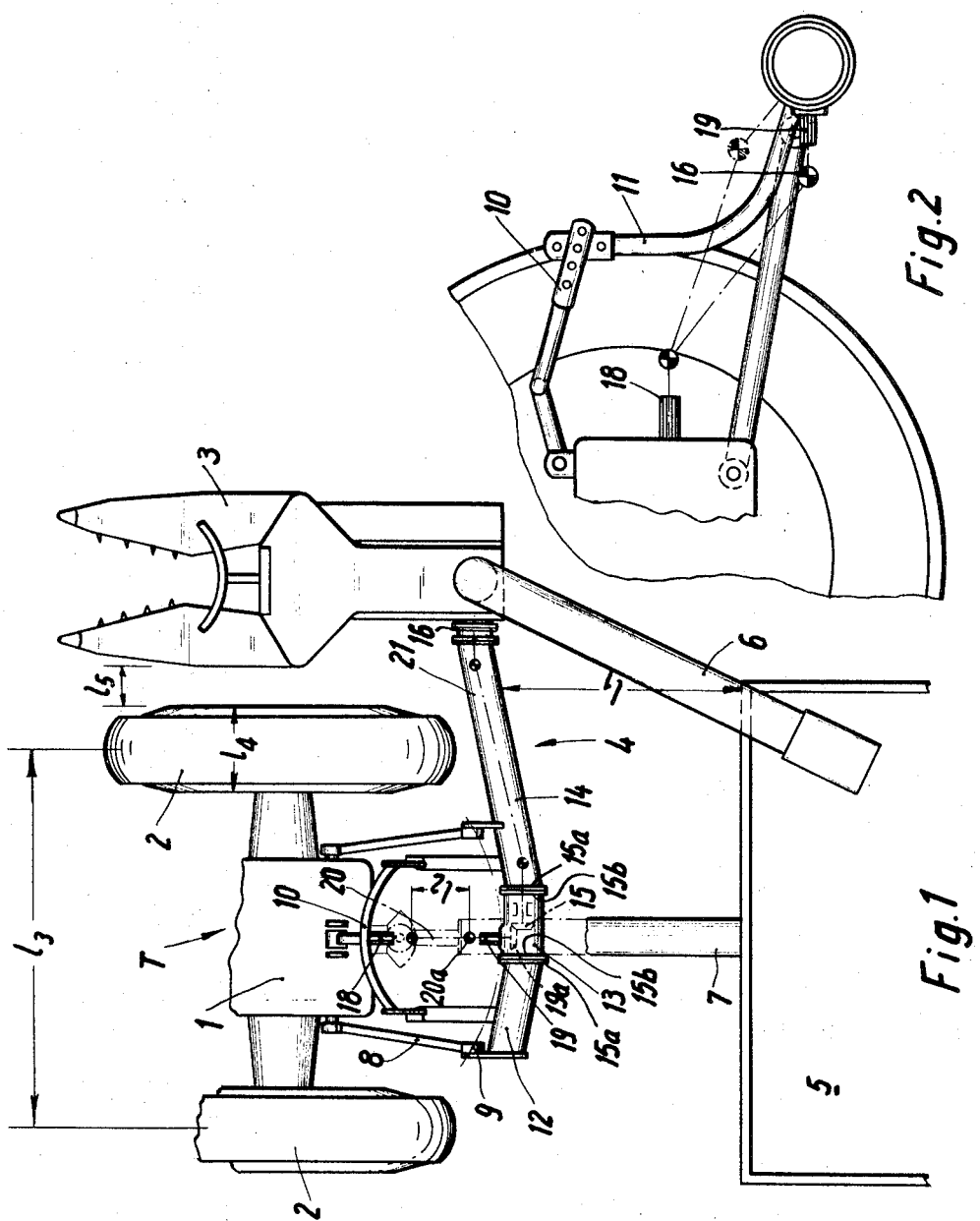

PATENTED APR 27 1971 3,576,227

Inventors
WILHELM KONRAD LIPPL
FRANZ XAVER LENZER

BY McGlew & Toren
ATTORNEYS

ATTACHMENT DEVICE FOR AN AGRICULTURAL MACHINE

The invention is directed to a device for attaching an agricultural implement alongside a tractor or prime mover and, more particularly, it is concerned with the construction of both a carrier arm for securing the agricultural implement to the side of the tractor and a power transmission means for operating the implement from the tractor.

By coupling agricultural implements to the side instead of the rear of a prime mover, such as a tractor, wagons or trucks can be secured directly to the tractor for receiving the material processed by the implement. The wagons or trucks can be removed or replaced on the tractor without interferring with the implement.

Attachment arms have been known for securing agricultural implements such as harvesting machines and the like to the side of a tractor. These attachment arms are secured to the rear of the tractor and extend in cantilever fashion laterally from the side of the tractor for securing the implement alongside the rear wheel of the tractor. The cantilevered attachment arms used in the past have been substantially straight tubular members and, due to this configuration, difficulties have been encountered in maneuvering wagons or the like which are secured to the rear of the tractor in the fashion of a trailer.

Recently, it has been proposed to use the cantilevered attachment arm for securing a corn cultivator to the side of a tractor. In this arrangement the attachment arm is a hollow member and supports a universal joint shaft for driving the agricultural implement. Because of its straight configuration parallel with the rear axle of the tractor, the power takeoff extending between the tractor and the attachment arm is very short. Because of this short connection the offset distance from the power takeoff to the power connection to the agricultural instrument is relatively great. Accordingly, in such an arrangement a certain degree of nonuniformity is developed in each of the joints. Even though there is uniform rotary movement at the power takeoff connection on the tractor, the power transmission shaft to the agricultural implement first leads at every half revolution and then lags for the remainder. This phenomenon leads to strong acceleration and retardation forces in the implement and results in early wear and frequent repair.

Therefore, it is a primary object of the present invention to construct the attachment arm so that any equipment hitched to the tractor can be turned without difficulty or interference from the agricultural implement. Moreover, the arm affords a greater distance between the power takeoff on the tractor and the universal joint shaft in the attachment arm so that the total offset ratio from the change-of-direction gear means is smaller.

Accordingly, the attachment arm has a curved form whereby the points of attachment between the arm and the links from the tractor lie in a circular track and the portion of the arm extending to the agricultural implement forms a tangent with the circular track.

With the attachment arm curving forwardly toward the tractor the agricultural implement attached to its cantilevered end is located at a point further forward than had been possible in the past and, as a result, any trailer or wagon secured to the rear of the tractor can be moved closer to its rear axle.

Because of this arrangement, the change-of-direction gear, such as a bevel gear, located between a universal joint shaft from the tractor and a similar shaft extending to the agricultural implement is located at the intersection of the tangents with the circular track and, as a result, the maximum length of the universal joint shaft from the tractor is obtained and provides the minimum possible offset in attaching the implement to the attachment arm.

The attachment arm may be in the form of several straight parts interconnected in the form of an arc.

Another feature of the invention is the use of an adjustable universal joint shaft within the attachment arm which provides a telescoping action for extending or retracting the shaft as required in securing the agricultural implement to the tractor. Due to the adjustable feature of the shaft the coupling of the agricultural implement can be facilitated. Further, by employing this adjustable arrangement the adjustable shaft can be coupled to machines which are not directly secured to the attachment arm. In such an arrangement the adjustable shaft can extend from the arm in a cantilever fashion, laterally of the tractor, for attachment to other machines, for example conveying blowers. In such an arrangement it is possible to transmit torque to agricultural implements located at different distances from the tractor.

By employing laterally cantilevered attachment arms maximum maneuverability is achieved in various farming operations and, as mentioned previously, a trailer, wagon or similar vehicles can be attached to the tractor without interfering with the agricultural implement secured alongside it. Unfortunately, a single attachment arm cannot be employed for all tractors or prime movers because the position of the power takeoff connection from the tractor is not uniform. Accordingly, to satisfy the various positions of the takeoff connections a plurality of attachment arms would be required. However, it is another object of the present invention to provide an attachment arm which can be adapted to the various positions of the power takeoff connections from different tractors.

Therefore, in accordance with the present invention, the attachment arm is formed of at least three serially arranged interconnected parts joined by flanges or similar mechanisms which permit the individual parts to be rotated relative to one another. In this arrangement the attachment arm is formed of at least a middle part and a pair of end parts, one located at each end of the middle part. The end parts are secured to the lower links and connection frame of the tractor. A universal joint shaft is secured at one end to the power takeoff from the tractor and at its opposite end to the power transmission means within the middle part of the attachment arm. In this manner differences in the positions of the linkages between the tractor and the attachment arm and between the power takeoff and the attachment arm can be accommodated due to the relative rotational movement between the parts forming the attachment arm.

By employing the multiple part construction of the attachment arm it is possible, by the rotation of the middle part of the arm, to move the connection from the power takeoff to the change-of-direction gear within the adjustment arm from a position in a parallel plane with the power takeoff connection into a plane which intersects the plane of the power takeoff connection. It is then possible to overcome impermissibly large Z-like flexure of the universal joint shaft into a W-shaped flexure which can be easily accommodated. Due to the attachment arm construction different locations of the power takeoff connection can be readily accommodated.

In addition to providing adjustability in the length of the universal joint shaft connected to the agricultural implement, it is also possible, in accordance with the present invention, to adjust the arm for different wheelbases and tire widths on tractors.

Accordingly, in the present invention the end of the attachment arm secured to the agricultural implement is provided with flanges so that an auxiliary part can be added to the arm for accommodating differences in the transverse dimensions of the tractor.

In another embodiment of the invention, the attachment arm is formed of at least two parts which are interconnected by flanges or the like. In such a construction one of the parts contains a bevel gear for changing the direction of the torque from the tractor power takeoff to a universal joint shaft located in the other part of the attachment arm.

Where heavy agricultural implements are employed great bending forces may be exerted on the links between the tractor and the cantilevered attachment arm which could cause difficulty in positioning and operating the implement.

Another object of the invention is to provide a linking construction between the tractor and the attachment arm which will relieve the lower linking members from excessive forces.

Accordingly, a flexible support arrangement is provided for the attachment arm which is comprised of at least three parts with an end part on either side of a middle part which is aligned with the power takeoff connection on the tractor. A rigid lower linking member is secured to the tractor and it is articulated at the other end to the end parts of the attachment arm. In addition, a crank-type offset arm is secured to one of the end members and extends toward the tractor and it is supported by a carrying device which makes it possible to lift and lower the agricultural implement as required.

Therefore, in accordance with the present invention a crank arm is secured to the attachment arm and extends forwardly to or beyond the center of gravity of the tractor. For easy movement of the attachment arm and the agricultural implement affixed to its end, lift device is attached to the crank arm. One device which is especially suitable for such operation is a hydraulic lift which also includes means for accommodating any crank thrust caused in the pivoting action and, further a pump is provided for operating the hydraulic mechanism from a point easily accessible to the operator of the tractor.

By employing the hydraulic lift device or similar apparatus the attachment arm and the agricultural implement secured to its cantilevered end can be moved between the transport position and its working position by means of a simple and structurally sound arrangement.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

FIG. 1 is a somewhat schematic showing of a top view of the rear portion of a tractor with a device for securing an agricultural implement laterally of the tractor in accordance with the present invention;

FIG. 2 is a generally schematic side view illustrating the connection between the tractor and the attachment arm shown in FIG. 1;

Figure 3:
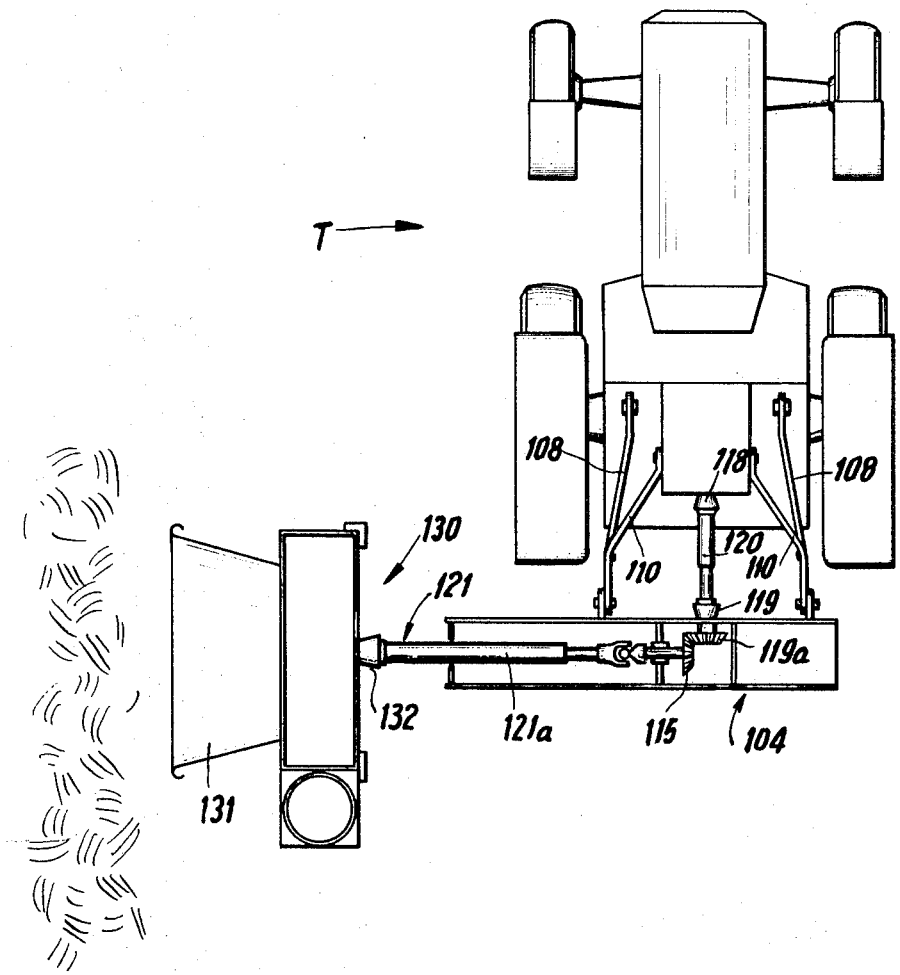
FIG. 3 is a schematic top view illustrating another embodiment of the present invention.

In FIG. 1, the rear end of a tractor T is shown having a rear riding axle 1 on which are mounted a pair of tractor wheels 2. Located laterally of the right-rear wheel 2 of the tractor is a corn cultivator implement 3 mounted on the outer end of an attachment or carrier arm 4 which at its opposite end is secured to the rear of the tractor T. A wagon or trailer 5 is attached to the rear of the tractor T by a hitch member 7. A loading chute 6 is secured to the implement 3 and extends rearwardly into the wagon 5.

As shown in FIG. 1, the attachment arm 4 is secured to the rear of the tractor by means of a three-point connection. A pair of lower support links 8 are secured to the lower part of the tractor, see FIG. 2, and extend rearwardly to hinge connections 9 secured to the attachment arm 4. The third point of connection to the tractor is provided by an upper link 10 attached between the lower links 8 and secured to the attachment arm by means of a fork-shaped holding frame 11.

The attachment arm 4 has a generally arcuate configuration formed by a plurality of hollow sections or parts 12, 13, and 14, which extend transversely of the normal direction of travel of the tractor with the middle section 13 being disposed substantially perpendicular to the axis of the tractor. The upper and lower links securing the attachment arm to the tractor are attached to the sections 12 and 14. The middle section 13 is secured to the end sections 12 and 14 by means of flanges 15a, 15b which permit the relative rotational movement between the parts which make up the adjustment arm. Secured at the outer end of the end section 14, an auxiliary part 16, which permits adjustment of the distance between the middle section 13 of the adjustment arm and its outer end, is attached to the implement 3. It will be appreciated that depending upon the dimension of the wheelbase of the tractor and of the tire width of the wheels 2 the distance from the axis of the tractor to the point of the attachment to the working implement will vary for different tractors or prime movers and as a result an adjustable auxiliary part or section affords the required variation in dimension.

As mentioned above, the flanges 15a, 15b permit rotational movement between the middle section 13 and end sections 12, 14 of the adjustment arm, while the upper and lower links are secured to the end parts 12 and 14 so that the middle part 13 can move relative to the position assumed by the end parts due to their attachment to the upper and lower links.

In addition to supporting the implement 3, the attachment arm 4 holds the power transmission means which extends between a power takeoff connection 18 on the rear of the tractor and the implement. Extending from the power takeoff 18 is a universal joint shaft 20 which is secured to a universal joint 20a and transmits the power from the tractor to a connection 19 for a change-of-direction or bevel gear 19a. From the bevel gear 19a the power is transmitted to a second bevel gear 15 set at right angles which is secured to a universal joint shaft 21 which extends through the attachment arm to a power takeoff connection, not shown, on the working implement.

While the middle section 13 of the adjustment arm is approximately perpendicular to the axis of the tractor and to the shaft extending from the power takeoff 18 on the tractor to the connection 19 to the bevel gear 19a, the end sections 12 and 14 of the adjustment arm are arranged at an acute angle to the axis of the tractor and extend forwardly, that is in the direction of the travel of the tractor, from the flanged connections to the middle section. This forwardly inclined configuration of the end sections of the adjustment arm places the agricultural implement 3 as far forward of the rear of the tractor as is possible for ease in maneuverability of the tractor and of the wagon 5 secured to it through the hitch bar 7. With the end sections 12 and 14 extending forwardly, the wagon 5 can be maneuvered through a sharper curve than would be the case if a straight adjustment arm was used in mounting the agricultural implement on the tractor.

Because of the generally curved configuration provided to the adjustment arm the middle section 13 is positioned at the maximum dimension rearwardly from the tractor as compared to the case where a straight adjustment arm is used. Accordingly, the distance $l_2$ from the power takeoff connection on the tractor to the connection 19 to the bevel gear 19a is greater and a universal joint shaft 20 of greater length can be inserted between these two connections. Therefore, as indicated in FIG. 2, the total offset between the input and output connections to the shaft 20 present a smaller angle, and accordingly, a more efficient arrangement for transmitting power from the tractor through the adjustment arm to the agricultural implement.

As shown in FIG. 1, the points of connection between the upper and lower links and the power transmission means are located on a circular arc which passes through the connection 19 and the hinged connections 9 between the end sections of the attachment arm and the lower links 8 connecting the arm to the tractor. In this arrangement the attachment arm 4 approximately coincides with one of the tangents to the circular arc passing through the connection means.

In FIG. 3, another embodiment of the present invention is shown with an attachment arm 104 secured to the rear end of the tractor T by means of lower links 108 and struts 110. A power takeoff connection 118 is mounted on the rear end of the tractor and is connected by means of a universal joint shaft 120 which is secured at its opposite end to a power connection 119 mounted on the attachment arm and secured to the change-of-direction or bevel gear 119a. A second bevel gear 115 is disposed at right angles to the bevel gear 119a and a telescopically constructed universal joint shaft 121 extends from the bevel gear 115 laterally through the attachment arm 104 to a point located outwardly from the sides of the tractor and to the rear of its wheels at which point it is connected to a blower 130. Located on the opposite side of the blower from the attachment arm is a suction hood 131 through which hay or similar material is conveyed to the blower.

The universal joint shaft 121 is formed with a telescopic piece 121a which can be adjusted to variable lengths in accordance with the dimension or location of the agricultural implement to which the power transmission means are connected. In this arrangement the cantilever arm supports the power transmission means but is not attached to the agricultural implement itself as is the case in FIGS. 1 and 2.

At its outer end the universal joint shaft 121 is provided with an end coupling 132 and the position for securing the coupling to the agricultural implement 130 can be adjusted by moving the tractor and its hydraulic system as required.

In FIG. 3, the attachment arm 104 is shown having a straight configuration formed by a continuous tubular member, however, it can be appreciated that an arrangement such as shown in FIG. 1, could be used in a similar manner to that displayed in FIG. 3.

Figure 4:
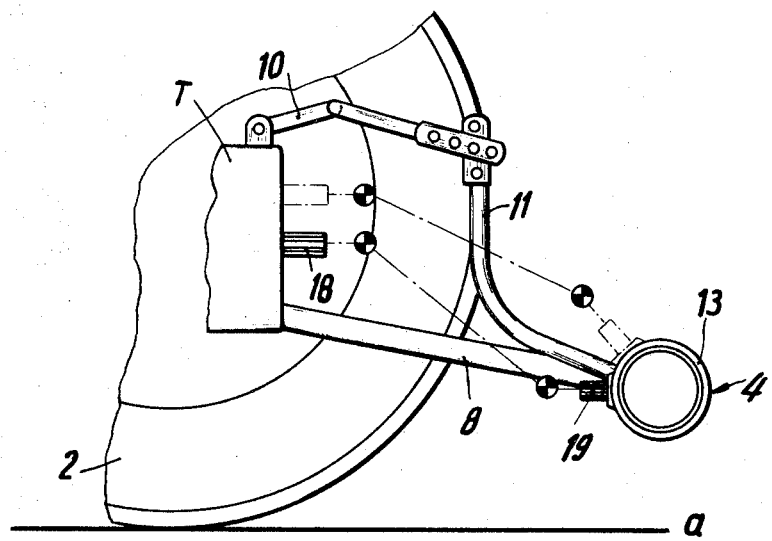
FIG. 4 is a schematic side view similar to FIG. 2 exhibiting another embodiment of the present invention.

In FIG. 4, the manner in which the middle section 13 of the attachment arm 4 is rotatable for accommodating various positions of the power takeoff means 18 from the tractor T is shown. In dotted lines above the power takeoff connection 18 there is shown another similar power takeoff connection spaced a greater distance above the ground line a. Due to the ability of the middle section 13 to rotate relative to the end sections 12 and 14, if the takeoff connection from the tractor is displaced upwardly or downwardly the middle section 13 will rotate correspondingly, relative to the end sections 12 and 14, to accommodate the different positions of the power takeoff connection 18. With this adjustable characteristic the flexure required is reduced and instead of an impermissible Z-shaped flexure a more adaptable W-shape flexure is obtained.

Referring again to FIG. 1, it will be noted that the wheelbase $l_3$ of the tractor, the tire widths $l_4$ may be of varying dimensions depending on the tractor or other prime mover employed. Moreover, it is desired to maintain the agricultural implement 3 at a uniform dimension $l_5$ from the right-rear wheel of the tractor 2. Accordingly, as indicated previously an auxiliary tubular part 16 is added to the attachment arm 4 to make up the dimensional difference experienced due to any variations in the wheelbase $l_3$, the tire width $l_4$. In such an arrangement, though not shown in FIG. 1, a telescopically arranged universal joint shaft, such as shown in FIG. 3, can be employed for adjusting the length of the shaft to any variations in dimension between the bevel gears aligned behind the tractor and the agricultural implement located laterally of the tractor.

In FIGS. 5 to 8, an alternate embodiment of the present invention is displayed incorporating means for lifting and lowering the adjustment arm so that the agricultural implement can be moved between the traveling and the working positions. In the drawing the rear end of a tractor T is shown having a pair of wheels 202 mounted on a rear axle 201. Located laterally from the right-rear wheel of the tractor is an agricultural implement 203 of the same type as shown in FIG. 1. Extending rearwardly from the agricultural implement is a discharge chute 206 which is arranged to deliver material into a wagon or the like, not shown, which would be hitched to the tractor by means of the tow jaw 240.

At the rear end of the tractor T an adjustment arm 204 is connected by a three-point means comprising lower links 208 articulated to the attachment arm by hinge connections 209.

The attachment arm 204 is formed of a middle section 213 aligned rearwardly of the power takeoff connection 218 on the tractor. On either side of the middle section 213 are end sections 212, 214, which are connected through flanges 215a, 215b for affording the desired rotational movement between the middle section and the end sections. Though not shown in FIGS. 5 to 8, power transmission means are provided between the power takeoff connection 218 on the tractor and the bevel gears 219a, 215 within the attachment arm 204 for transferring the power required to operate the agricultural implement 203.

Figure 5:
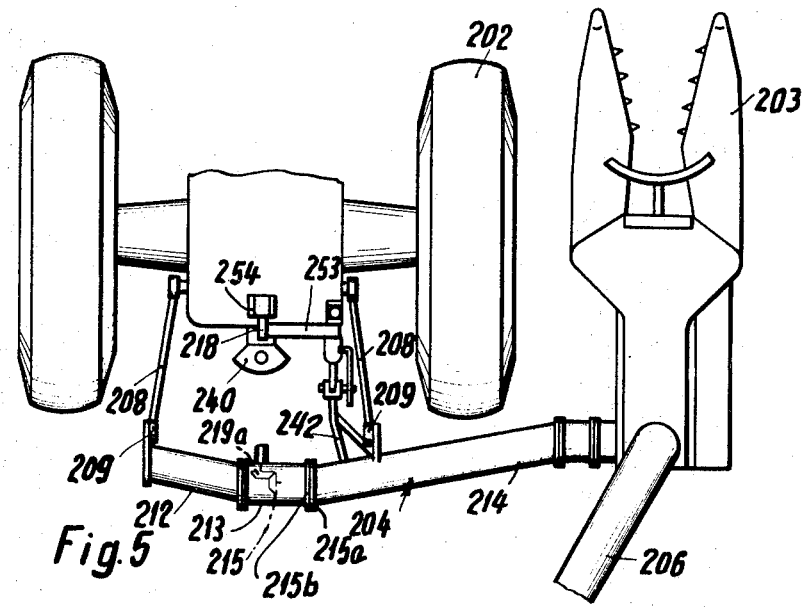
FIG. 5 is a top view, similar to FIG. 1, illustrating still another embodiment of a support arrangement between the tractor and the attachment arm in accordance with the present invention.
Figure 6:
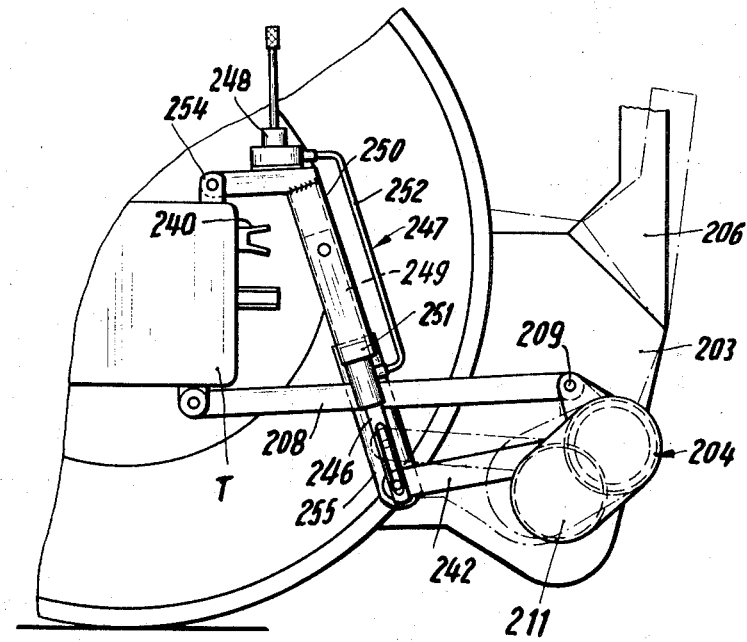
FIG. 6 is a partial side view of the arrangement shown in FIG. 5.
Figure 7:
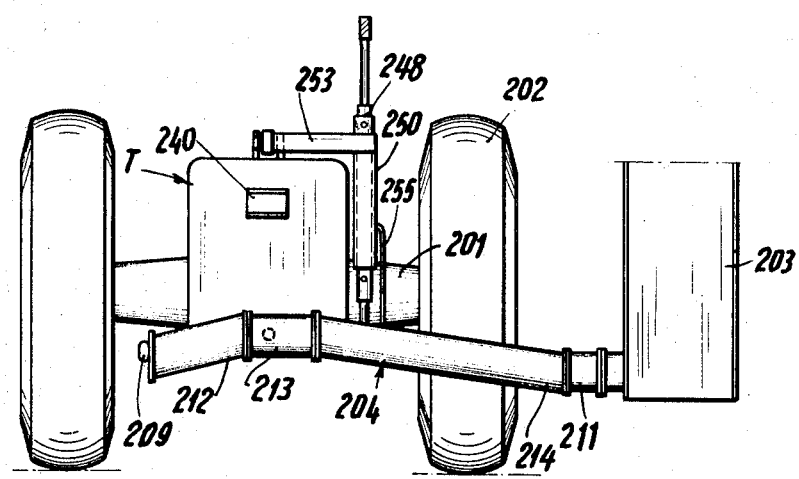
FIG. 7 is a rear view of the arrangement shown in FIGS. 5 and 6.

In addition to the lower links 208 which are held rigidly at the position shown in FIG. 6, it can be noted in FIGS. 6 and 7, that the attachment arm 204 not only has a curved configuration in the horizontal plane as shown in FIG. 5, but also in the vertical plane, as best indicated in FIG. 7, giving the arm 204 a cranklike appearance.

Figure 8:
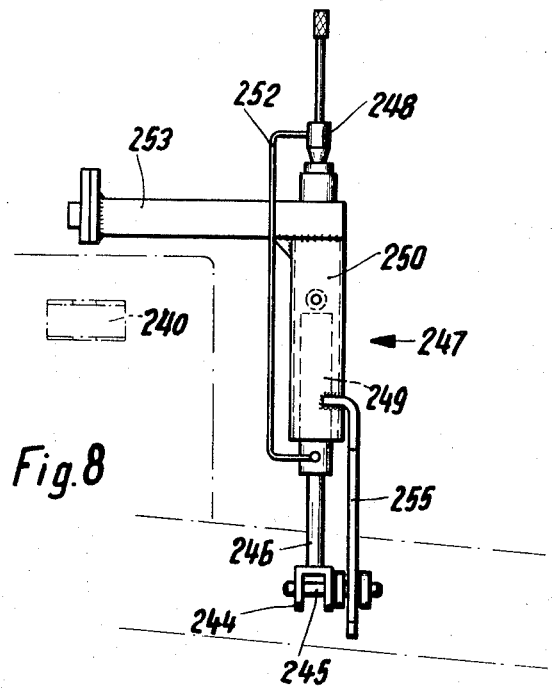
FIG. 8 is an enlarged detail view of a portion of FIG. 7.

Close to the connection of the right-hand lower link 209 to the attachment arm 204 a crank arm 242 is mounted within a fork 244 and is secured in place by means of a bolt 245, see FIG. 8. The fork 244 is mounted on the lower end of a piston rod 246 which forms part of a hydraulic lift unit 247. Hydraulic fluid is forced into the hydraulic lift unit 247 by means of a hand pump 248 which is accessible to the tractor operator from the driver's seat. The hydraulic lift unit contains a universally mounted cylinder 249 positioned with a protective sleeve 250, when oil is pumped into the cylinder 249 the piston rod rises with the crank arm 242, see FIG. 6. For lowering the attachment arm 204 and the agricultural implement 203 secured to it, a valve, not shown, on the pump 248 is opened and the hydraulic fluid flows from the cylinder 249 by means of a conduit 250 into an oil storage tank, not shown. It can be seen in FIGS. 6 to 8 that the pump 248, with the hydraulic unit 247 is articulated by means of a crossarm 253 to an upper link 254 of the hydraulic system in the tractor. In this arrangement of the hydraulic lift unit and the crank arm, the tow jaw 240 is unobstructed and a wagon or similar vehicle can be secured to the rear of the tractor without any interference with the attachment arm or from the means supporting the attachment arm.

Depending on the position of the crank arm 242, the cantilevered end of the attachment arm with the agricultural implement 203 is pivoted about the hinged connections 209 between the lower links 208 and the attachment arm. Due to the rocking action thus formed the agricultural implement 203 can be lowered to the ground or lifted into the transport position by means of the hydraulic lift unit 247.

Based on the manner in which agricultural implements are affixed to a tractor in accordance with the present invention, a wagon can be easily attached to the tow jaw 240 at the rear of the tractor without any interference from the attachment arm. As indicated previously the configuration of the arm permits the tractor and the wagon to make sharp turns without any interference from the arm.

By employing the hydraulic lift unit 247 the lower link on the right-rear side of the tractor is relieved almost completely of heavy compressive stresses due to the action of the hydraulic lift unit. A slot guide 255 formed in the sleeve 250 prevents any jamming of the crank arm joint 244,245.

The embodiments of the invention in which an exclusive property or privilege is claimed are defined as follows:

We claim:

1. A device for attaching an agricultural working implement to a prime mover such as a tractor, comprising a longitudinally extending carrier arm arranged to be located at the rear of the prime mover, said carrier arm having its longitudinal axis extending transversely of the direction of travel of the prime mover, said carrier arm having a first end and a second end, means for securing the first end of said carrier arm to the rear of the prime mover with the second end thereof arranged to extend outwardly from one side of the prime mover for connecting an agricultural working element thereto adapted to be positioned alongside the prime mover, power transmission means supported by said carrier arm and arranged to be connected at one end to a power takeoff means on the prime mover and at the other end to the agricultural working element for delivering power thereto, characterized therein that said carrier arm comprises a plurality of aligned interconnected hollow parts extending in the direction of its longitudinal axis, said interconnected parts comprising a first part arranged to be positioned rearwardly of the power takeoff means on the prime mover adjacent the first end of said carrier arm and a second part connected at one end to said first part and extending in the longitudinal direction of said carrier arm toward the second end thereof, and means interconnecting said first and second parts to permit relative rotational movement therebetween about the longitudinal axis of said carrier arm, 2. A device, as set forth in claim 1, wherein said carrier arm comprises at least a third part connected to said first part on the opposite end thereof from said second part, and said means for securing said carrier arm to the rear of the prime mover comprising a pair of laterally spaced support elements, one of said support elements being articulated to said second part and the other said support element being articulated to said third part of said carrier arm, and the connections of said support elements to said second and third parts being spaced from said first part of said carrier arm.

3. A device, as set forth in claim 2, wherein said means interconnecting said first, second and third parts of said carrier arm, comprising members secured to the ends of said first part and adjacent ends of said second and third parts for permitting said first part to rotate relative to said second and third parts.

4. A device, as set forth in claim 3, wherein said means for securing the first end of said carrier arm to said prime mover comprises an upper link attached to the prime mover vertically above and spaced between said lower links and comprising a fork member attached at the ends thereof remote from said prime mover to said second and third parts of said carrier arm.

5. A device, as set forth in claim 2, wherein the axis of said first part extends in the transverse direction approximately perpendicular to the axis of the prime mover in its normal direction of travel, and the axis of said second part of said carrier arm being angularly disposed to the axis of said first part and forming an acute angle with the axis of the prime mover in its normal direction of travel.

6. A device, as set forth in claim 5, wherein the axes of said second and third parts slope downwardly from said first part.

7. A device, as set forth in claim 2, wherein said carrier arm comprises an auxiliary hollow part interconnecting the outer end of said second part with said agricultural working element.

8. A device, as set forth in claim 7, wherein said auxiliary part being arranged to be of different axial lengths for accommodating said carrier arm to prime movers of different wheelbase dimensions and tire widths.

9. A device, as set forth in claim 2, wherein said power transmission means comprises a power transmission first change-of-direction gear means located within said first part of said carrier arm, a power connection means attached to said change-of-direction gear means and extending in the axial direction of said prime mover, a first universal joint shaft interconnecting said power takeoff means on said prime mover and said power connection to said first change-of-direction gear means, and a second universal joint shaft mounted within said carrier arm, a second change-of-direction gear means secured to the end of said second universal joint shaft and intermeshed with said first direction change-of-direction gear means for transferring power taken from said power takeoff connection on said prime mover to the end of said second universal joint shaft for operating said agricultural working element.

10. A device, as set forth in claim 9, wherein said second universal joint shaft being adjustable in length for accommodating varying dimensions between the axis of said first universal joint shaft and the power connection to said agricultural working element.

11. A device, as set forth in claim 10, wherein said second universal joint shaft having a telescoping section for adjusting the length of said shaft.

12. A device, as set forth in claim 2, wherein a hydraulic lift unit is mounted on the rear of the power unit and is secured to said carrier arm for lifting and lowering the said carrier arm and said agricultural working element relative to the ground.

13. A device, as set forth in claim 12, wherein said hydraulic lift unit comprises an upwardly extending piston cylinder, a piston arm mounted in the lower end of said cylinder and arranged to be extended and retracted therein, the upper end of said cylinder being articulated to said prime mover, a crank arm secured to said second part of said carrier arm at one end and attached at its other end to the lower end of said piston arm.

14. A device, as set forth in claim 13, wherein said hydraulic lift unit comprises a hand pump for operating said hydraulic lift unit for lowering and lifting said crank arm, said hand pump arranged to be accessible from the operator's seat in said prime mover.

15. A device, as set forth in claim 1, wherein a traction tow connection is secured to the rear of said prime mover for attaching a wagon thereto, said connection being spaced from the means interconnecting said prime unit and said carrier arm for hitching up a wagon to said prime mover without interfering with the positioning of said agricultural implement.